United States Patent [19]
Kitamura

[11] Patent Number: 5,251,022
[45] Date of Patent: Oct. 5, 1993

[54] METHOD OF AND APPARATUS FOR PRODUCING OVERLAPPING IMAGE AREA

[75] Inventor: Hideaki Kitamura, Kyoto, Japan

[73] Assignee: Dainippon Screen Manufacturing Co., Ltd., Japan

[21] Appl. No.: 788,211

[22] Filed: Nov. 5, 1991

[30] Foreign Application Priority Data

Nov. 6, 1990 [JP] Japan ................... 2-300565

[51] Int. Cl.⁵ .................................... H04N 5/272
[52] U.S. Cl. ............................ 358/528; 358/183
[58] Field of Search .......................... 358/75-80, 358/182-183

[56] References Cited

U.S. PATENT DOCUMENTS

| | | | |
|---|---|---|---|
| 4,805,022 | 2/1989 | Abt | 358/183 |
| 4,812,909 | 3/1989 | Yokobayashi et al. | 358/183 |
| 4,996,598 | 2/1991 | Hara | 358/183 |
| 5,023,720 | 6/1991 | Jardins | 358/183 |
| 5,042,078 | 8/1991 | Oshikoshi et al. | 358/183 |
| 5,046,165 | 9/1991 | Pearman et al. | 358/183 |

Primary Examiner—Stephen Brinich
Attorney, Agent, or Firm—Ostrolenk, Faber, Gerb & Soffen

[57] ABSTRACT

An overlapping image area is produced on the border between adjacent image areas by processing of image data so as to eliminate a dropout due to registering mismatch. A target image area CR2, specified by an operator, is expanded by a predetermined width d to produce overlapping image areas CR4 and CR5. The color of the overlapping image area CR4 or CR5 is determined based on the color of the target area CR2 and the original color of the overlapping image area CR4 or CR5. For example, the larger value between each color component of the original color of the overlapping image area and that of the color of the target area is selected as the new color component of the overlapping image area.

16 Claims, 15 Drawing Sheets

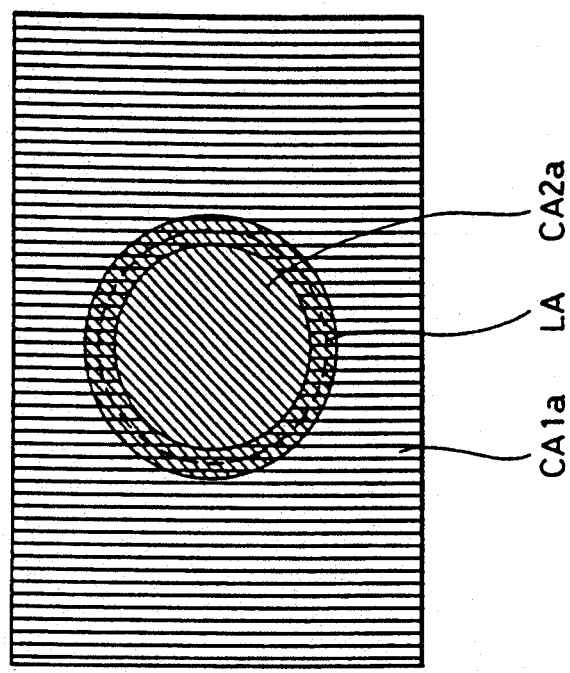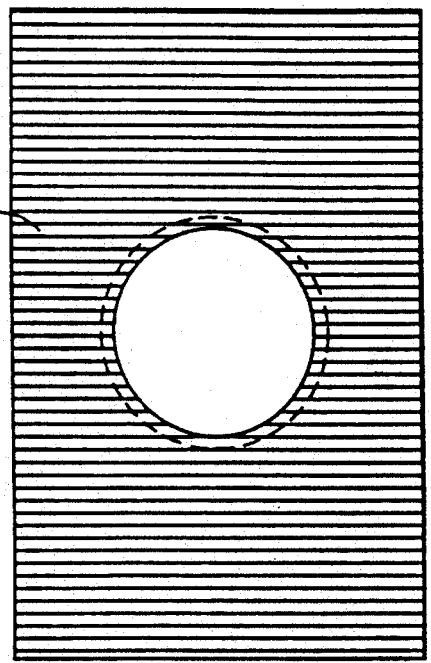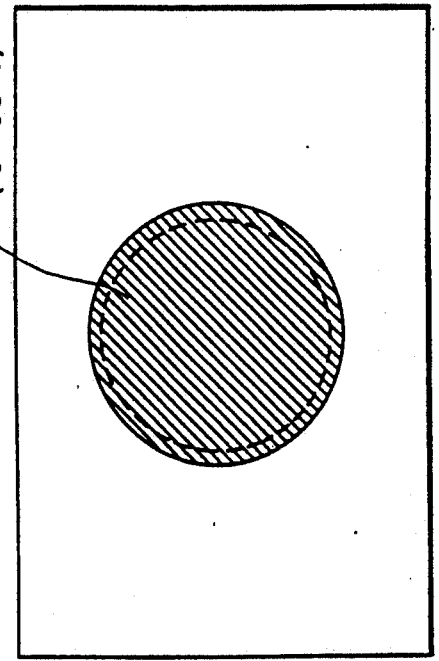

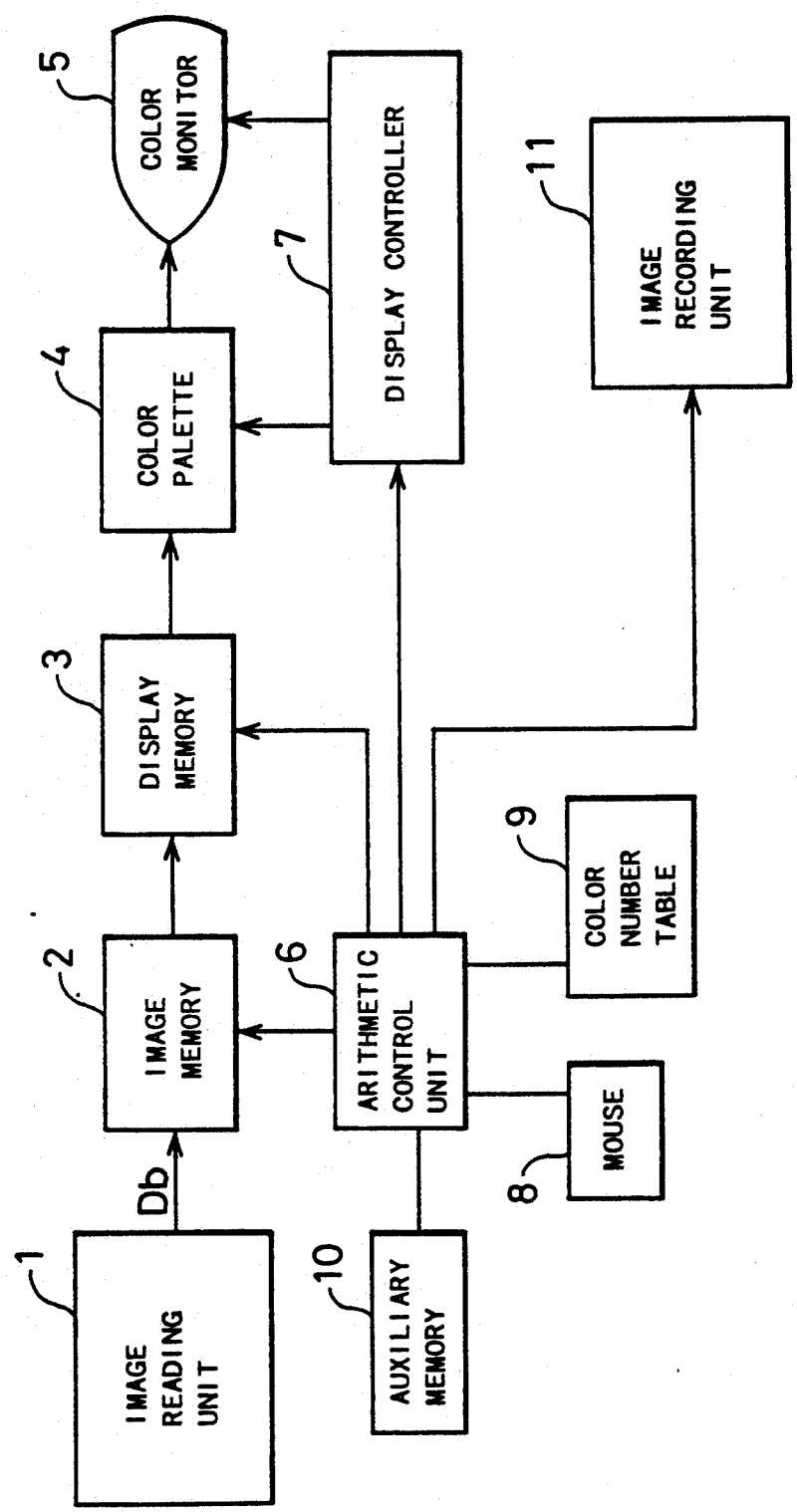

Fig. 8A

| A1 | A8 | A7 |
|----|----|----|
| A2 | P  | A6 |
| A3 | A4 | A5 |

IST

| Ns(2) = Ns(4) |
| Ns(5) = Ns(6) |

METHOD OF AND APPARATUS FOR PRODUCING OVERLAPPING IMAGE AREA

BACKGROUND OF THE INVENTION

1. Field of the Invention

The present invention relates to a method of and an apparatus for producing an overlapping image area so as to eliminate a dropout due to registering mismatch in printing.

2. Description of Related Art

Four printing plates for yellow (Y), magenta (M), cyan (C), and black (K) inks are generally used for color printing. Although color printing machines are highly accurate and precise, high-speed rotary press may cause registering mismatch of approximately +0.05mm between the four printing plates. Various methods have been proposed in preparation of printing plates to eliminate such registering mismatch and maintain the quality of printed matter.

FIG. 1A is a conceptive view illustrating an image including two color areas CA1 and CA2 adjacent to each other.

Now the color of each area, shown by C[color area ID], is defined by dot% Hy, Hm, Hc, and Hk of yellow (Y), magenta (M), cyan (C), and black (K) as follows:

$$C[\text{color area ID}] = (H_y, H_m, H_c, H_k).$$

The colors of the color areas CA1 and CA2, shown in FIG. 1A, are expressed by:

$$C[CA1] = (0, 80, 0, 0); \text{ and}$$

$$C[CA2] = (0, 0, 80, 0).$$

FIG. 1B shows an example of a defective image due to registering mismatch. In the image of FIG. 1B, the M plate is shifted in X direction by −0.05mm and the C plate by +0.05mm. The image includes two shift areas SA1 and SA2 in addition to the two color areas CA1 and CA2. The colors of the shift areas SA1 and SA2 are expressed by:

$$C[SA1] = (0, 0, 0, 0); \text{ and}$$

$$C[SA2] = (0, 80, 80, 0).$$

The shift area SA1 is a so-called dropout where no inks are applied, and which is conspicuous and deteriorates printed matter.

overlapping process is generally performed in pre-press to prevent such deterioration. The overlapping process is to modify the shapes of two adjacent areas at their boundary to thereby make part of these areas overlap each other.

FIGS. 2A through 2C are explanatory views illustrating the overlapping process for the image of FIG. 1A.

FIG. 2A shows a first color area CA1a after the shape modification. The modified color area CA1a surrounds a white area which is smaller than that of the original color area CA1 shown by a broken line.

FIG. 2B shows a second color area CA2a after the shape modification. The modified color area CA2a is larger than the original color area CA2 shown by a broken line.

FIG. 2C shows a resultant image printed by overlaying the modified color areas Ca1a and CA2a one upon the other; thus an overlapping area LA is produced therein.

The width of the overlapping image area LA is determined such that a dropout can be prevented due to registering mismatch. For example, when the registering mismatch is in the range of −0.05 mm to +0.05 mm, the overlaid LA has width of approximately −0.1 mm. The overlaid area LA acts as a margin between the corrected color areas CA1a and CA2a and effectively prevents a dropout due to registering mismatch.

The overlapping image area LA is thin across and has a color similar to both of the adjacent color areas CA1a and CA2a, thus being unobtrusive and preventing deterioration of the resultant image as empirically proved.

There are two methods generally applied to the overlapping process.

The first is an optical overlapping method. An image area of a uniform color, called a tint, is prepared with a mask and a tint sheet, and an overlapping image area is created by adjusting the size of the masked area. This method, however, requires some materials like a mask and a tint sheet and is thus costly.

The second method, which was recently proposed, is processing of image data with an image processor such as a page make-up system.

In the conventional overlapping process with the image processor, however, an operator needs to specify the width and the color of an overlapping image area for each image element such figures and characters. When an image includes a large number of image areas, such specification of the width and the color is both labor and time consuming.

SUMMARY OF THE INVENTION

An object of the invention is to facilitate the production of an overlapping image area.

The present invention is directed to a method of producing an overlapping image area on a boundary between adjacent image areas by processing image data of an original image including the image areas. The method comprises the steps of: (a) selecting one image area in the original image as a target area; (b) expanding the target area to produce the overlapping image area having a predetermined width along the contour of the target area; and (c) assigning a color to each pixel in the overlapping image area based on the original color of the pixel before the step (b) and the color of the target area.

According to an aspect of the present invention, the step (a) comprises the steps of: (a-1) preparing an original image data representing a black-and-white original image; and (a-2) performing color allocation on the original image on the basis of the original image data by dividing the black-and-white original image into plural image areas which are separate connected-components, and by allocating different colors to the respective plural image areas.

According to another aspect of the present invention, the step (b) comprises the steps of: (b-1) positioning a pixel mask for detecting a boundary between image areas at each pixel in an area including the target area, and adding a particular pixel in the pixel mask when detected to be at a boundary of the target area, to thereby expand the target area by a width of one pixel ; and (b-2) repeating the step (b-1) N times, where N is an integer, to thereby expand the target area by a width of N pixels.

Alternatively, the step (b) comprises the steps of: (b-1) preparing a first contour vector representing a contour of the target area; and (b-2) obtaining a second contour vector representing a contour of an expanded area, the contour of the expanded area distanced from the contour of the target area by the predetermined width.

Preferably, the step (c) comprises the step of: (c-1) determining density of each color component of the color for each pixel in the overlapping image area by selecting the larger value of densities of the pixel before the step (b) and of the target area with respect to each color component.

Alternatively, the step (c) comprises the step of: (c-2) determining density of each color component of the color for each pixel in the overlapping image area by averaging densities of the pixel before the step (b) and of the target area with respect to each color component.

The present invention is also directed to an apparatus for producing an overlapping image area on a boundary between adjacent image areas by processing image data of an original image including the image areas, comprising: selecting means for selecting one image area in the original image as a target area; expanding means for expanding the target area to produce the overlapping image area having a predetermined width along the contour of the target area; and color assigning means for assigning a color to each pixel in the overlapping image area based on the original color of the pixel before the expanding and the color of the target area.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A through 2C are explanatory views showing overlapping process;

FIG. 3 is a block diagram illustrating an image processor for producing an overlapping image area embodying the invention;

FIG. 8A is an explanatory view illustrating a 3×3 mask used for the expansion processing;

FIG. 8B is an explanatory view illustrating pixel coordinates of the target image and the 3×3 mask on the target image;

FIGS. 9A through 9D are explanatory views illustrating distributions of pixel color numbers allocated in the overlapping process;

FIGS. 13A through 13D are explanatory views showing the region segmentation process; and FIG. 14 is an explanatory view illustrating an identical system color table IST used for the region segmentation process.

DESCRIPTION OF THE PREFERRED EMBODIMENT

A. Structure of Apparatus

Figure 1B:
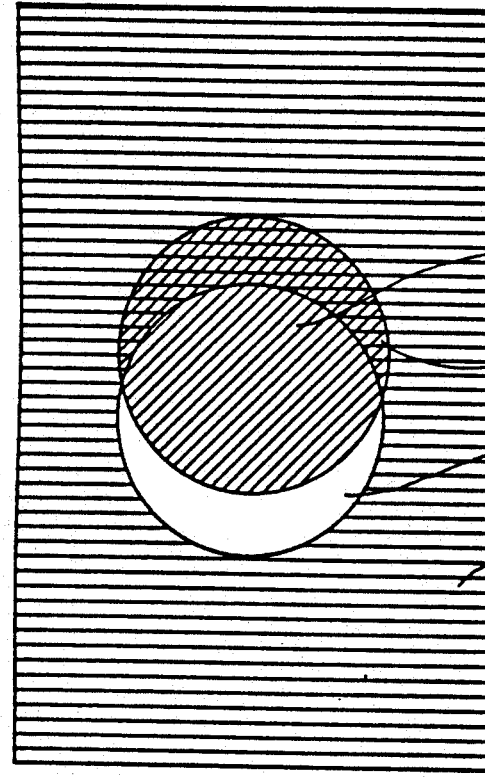
FIGS. 1A and 1B are explanatory views showing the change of an image due to registering mismatch.
Figure 1A:

FIG. 3 is a block diagram illustrating an image processor for producing an overlapping image area embodying the invention. The image processor includes the following elements:

(a) Image reading unit 1 for reading a block copy image and creating a binary image thereof; for example, a flat-bed type scanner;

(b) Image memory 2 for storing image data of a target image to be processed as bit map data and overlap information for each pixel; the overlap information includes color numbers, flags, and reference color numbers (described below);

(c) Display memory 3 for storing bit map data of an image to be displayed on a color monitor 5; the image data includes a color number assigned to each pixel and is renewed each time when the display is changed;

(d) Color palette 4 for converting the color numbers input from the display memory 3 to color data of R (red), G (green), and B (blue);

(e) Color monitor 5 for displaying the target image and the image after the overlapping process;

(f) Arithmetic and control unit 6 for controlling the other elements of the image processor and executing various processings such as expansion, control of a color number table 9, and determination of the color of each overlapping image area;

(g) Display controller 7 for controlling display of an image on the color monitor 5 and moving the cursor on the color monitor 5 in response to the movement of a mouse 8;

(h) Mouse 8 for specifying a target area in an image displayed on the color monitor 5;

(i) Color number table 9 for storing dot%, or halftone dot area rate, of each color component Y, M, C, and K with respect to each color number;

(j) Auxiliary memory 10 for storing the maximum width of registering mismatch and temporary information required for each processing; and (k) Image recording unit 11 for recording the image with an overlapping area on a recording medium such as a photosensitive film.

B. Processing Procedure

Figure 4:
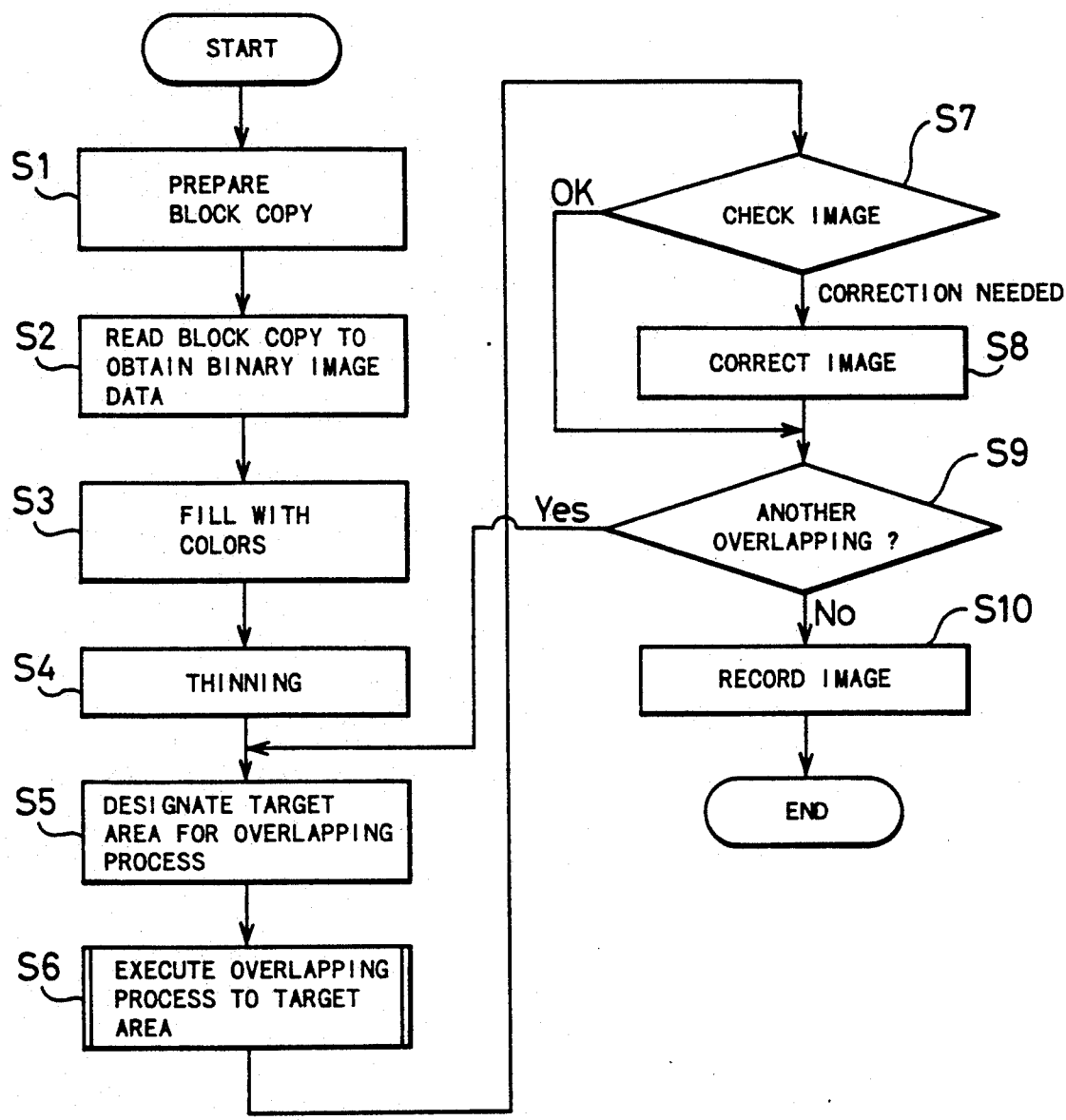
FIG. 4 is a flowchart showing the whole routine of overlapping process.

FIG. 4 is a flowchart showing the procedure of the overlapping process.

At step S1, a block copy is prepared by arranging characters and figures on a layout sheet. FIG. 5A is a plan view illustrating a block copy image BC to be processed, which includes a black open circle C, black segments L1 and L2 drawn above and below the circle C, and white background.

At step S2, the image reading unit 1 reads binary image data Db of the block copy image BC, which represents the color of each pixel, black or white, in the block copy image BC.

The whole block copy image BC is filled with colors at step S3. Namely, the block copy image BC is divided into separate areas, which are distinguished from one another by border lines, and a color number Nc is allocated to each separate area. The block copy image BC of FIG. 5A is divided into four separate areas: a black keyline area including the circle C and the segments L1 and L2, a white area R1 inside the circle C, and two white areas R2 and R3 surrounding the circle C. This division processing, or region segmentation processing, is performed by the arithmetic and control unit 6, and the color of each separate area is specified by the operator. Details of the region segmentation are described later.

At step S4, the black keylines C, L1, and L2 are thinned to be eliminated, so that only colored areas are left. Line thinning is executed, for example, according to methods described in U.S. Pat. Nos. 4,931,861 and 4,922,332, the disclosure of which is hereby incorporated by reference.

Figure 5B:
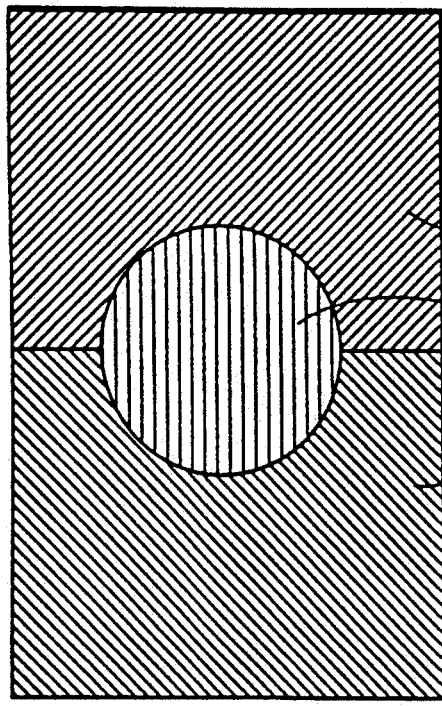
FIGS. 5A through 5C are conceptive views illustrating a target image to be processed.
Figure 5A:
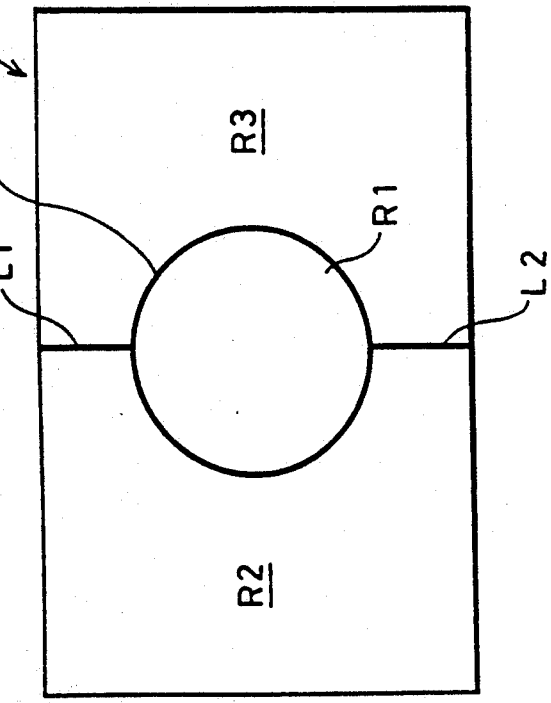

FIG. 5B shows a resultant image consisting of color areas CRI through CR3, which are directly in contact with one another. The colors of the areas CR1 through CR3 are specified, for example, as:

C[CR1]=(80, 0, 0, 0),

C[CR2]=( 0, 80, 0, 0), and

C[CR3]=( 0, 0, 80, 0).

The following data are assigned to the color areas CR1 through CR3 as seen in FIG. 5B:

a. Color number Nc, A numeral, for example, a ten-bit data, representing a color. Numerals one through three are allocated to the color areas CR1 through CR3, respectively.

b. Flag Fp: A flag, for example, a one-bit data, showing whether an area is produced by overlapping process. Since the overlapping process is not executed yet to the image of FIG. 5B, the flags of the color areas CR1 through CR3 are all "OFF".

c. Reference color number Nr: A color number, for example, a ten-bit data, which is allocated to an overlapping image area and which expresses the color of the overlapping image area before the overlapping process. The reference numbers are not yet allocated to the areas in the image of FIG. 5B.

The image of FIG. 5B is displayed of the color monitor 5 at step S4.

At step S5, the operator specifies a target area for the overlapping process in the image displayed on the color monitor 5 with the mouse 8. Here the color area CR2 is selected.

Figure 5C:
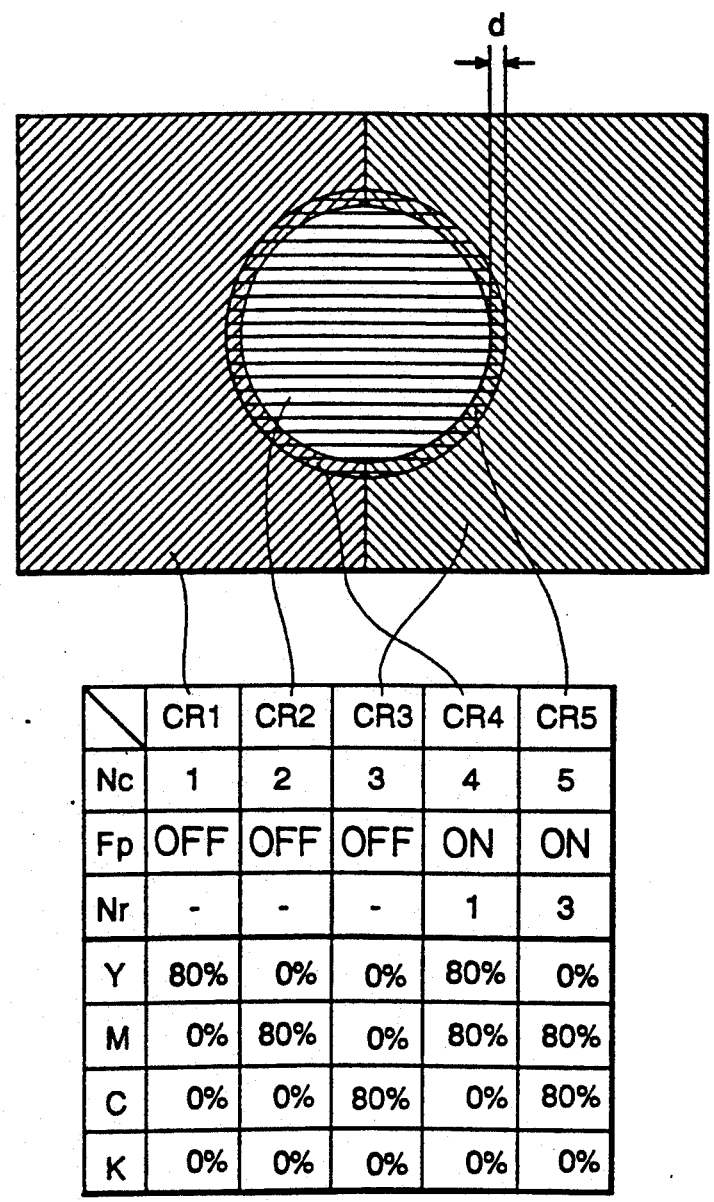

At step S6, the overlapping process is executed to the target area (the color area CR2) to produce the image of FIG. 5C. As seen in FIG. 5C, the overlapping process produces color areas or overlapping image areas CR4 and CR5 of a predetermined width d on the circumference of the target area CR2. The width d is determined to be equal to the maximum width of registering mismatch in the printing machine, and the value of the width d is previously stored in the auxiliary memory 10.

The flag Fp is "ON" in the overlapping areas CR4 and CR5, and the reference color numbers are 'one' and 'three', respectively.

The dot% of the overlapping area for each color component Y, U M, C, and K is determined by selecting the larger of the dot% of the target area CR2 and the dot% of the color represented by the reference color number Nr. In the embodiment, the colors of the overlapping image areas CR4 and CR5 are determined as follows:

C[CR4]=(80, 80, 0, 0), and

C[CR5]=( 0, 80, 80, 0).

Details of the overlapping process are described later.

The resultant overlapping image is displayed on the color monitor 5, which is checked by the operator at step S7.

When the displayed image needs some correction, the operator executes image correction including brushing and partial color change at step S8.

At step S9 it is determined whether another color area exists for the overlapping process. When the answer is YES, the program returns to step S5 and repeats steps S5 through S8.

At step S10, the processed image is recorded on a photosensitive film or a printing plate by the image recording unit 11.

In the embodiment described above, the overlapping image areas CR4 and CR5 of a predetermined width are produced on the circumference of the target area CR2. The colors of the overlapping image areas CR4 and CR5 are determined based on the color of the target area CR2 and the original colors of the areas CR4 and CR5 before the overlapping process. These processings are performed automatically, and hence the overlapping process is readily executed even for an image including a large number of image areas.

C. Details of overlapping process

Figure 6:
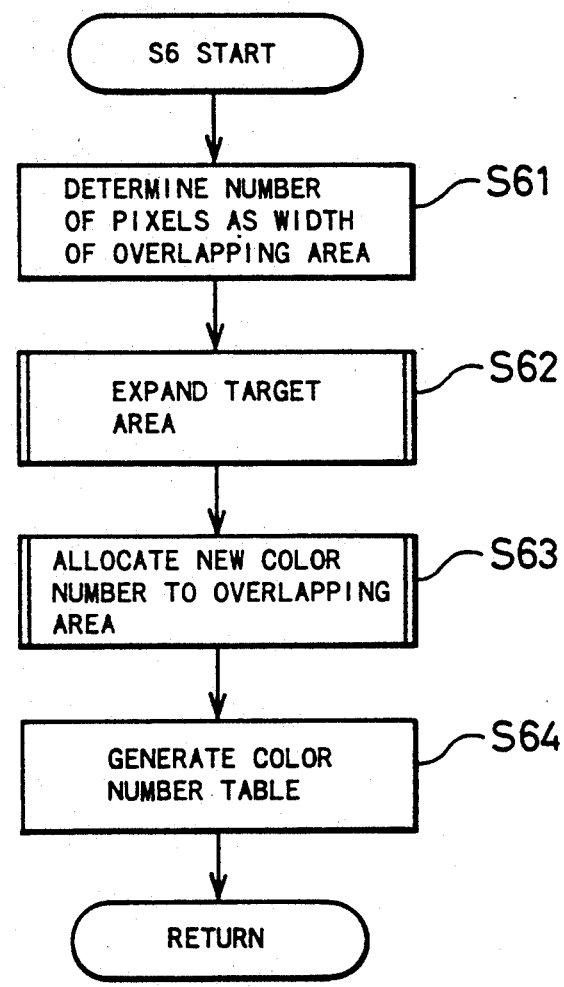
FIG. 6 is a flowchart showing details of the overlapping process.

FIG. 6 is a flowchart showing details of the overlapping process executed at step S6 of FIG. 4.

At step S61, a number of pixels m is determined corresponding to the width d of the overlapping image area by the arithmetic and control unit 6. IN the embodiment, the width d is set to be equal to the maximum registering mixmacth in the printing machine and previously stored in the auxiliary memory 10 as described before. The number of pixels corresponding to the width d is determined by dividing the value of d by the reading resolution of the image reading unit 1; the reading resolution is equal to the width of a pixel. For example, when the width d is 0.1 mm and the reading resolution is 0.05 mm, the number of pixels m is equal to 2.

At the step S62, the target area CR2 is expanded by the number of pixels m.

Figure 7:
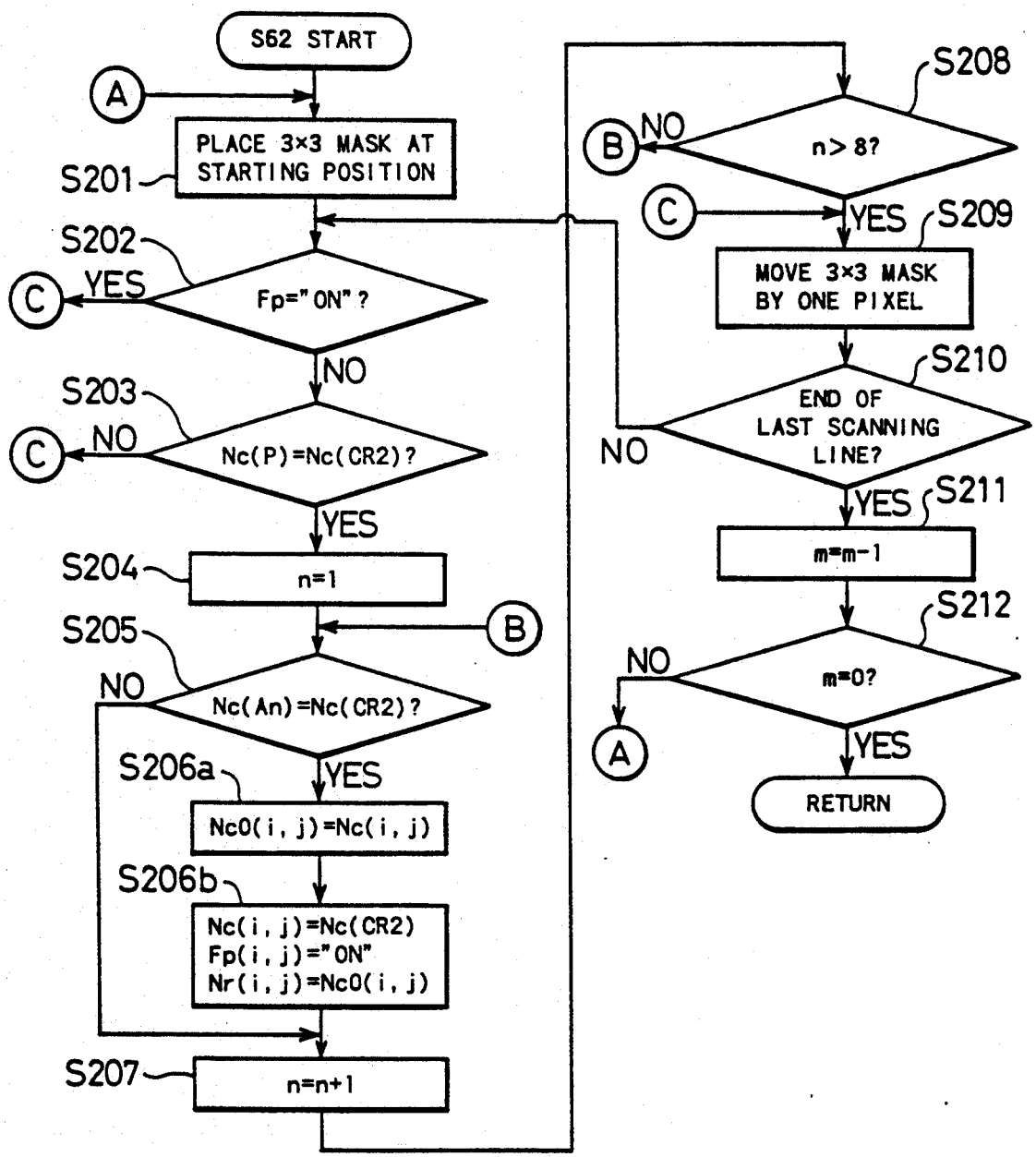
FIG. 7 is a flowchart showing details of expansion processing.
Figures 8A, 8B:
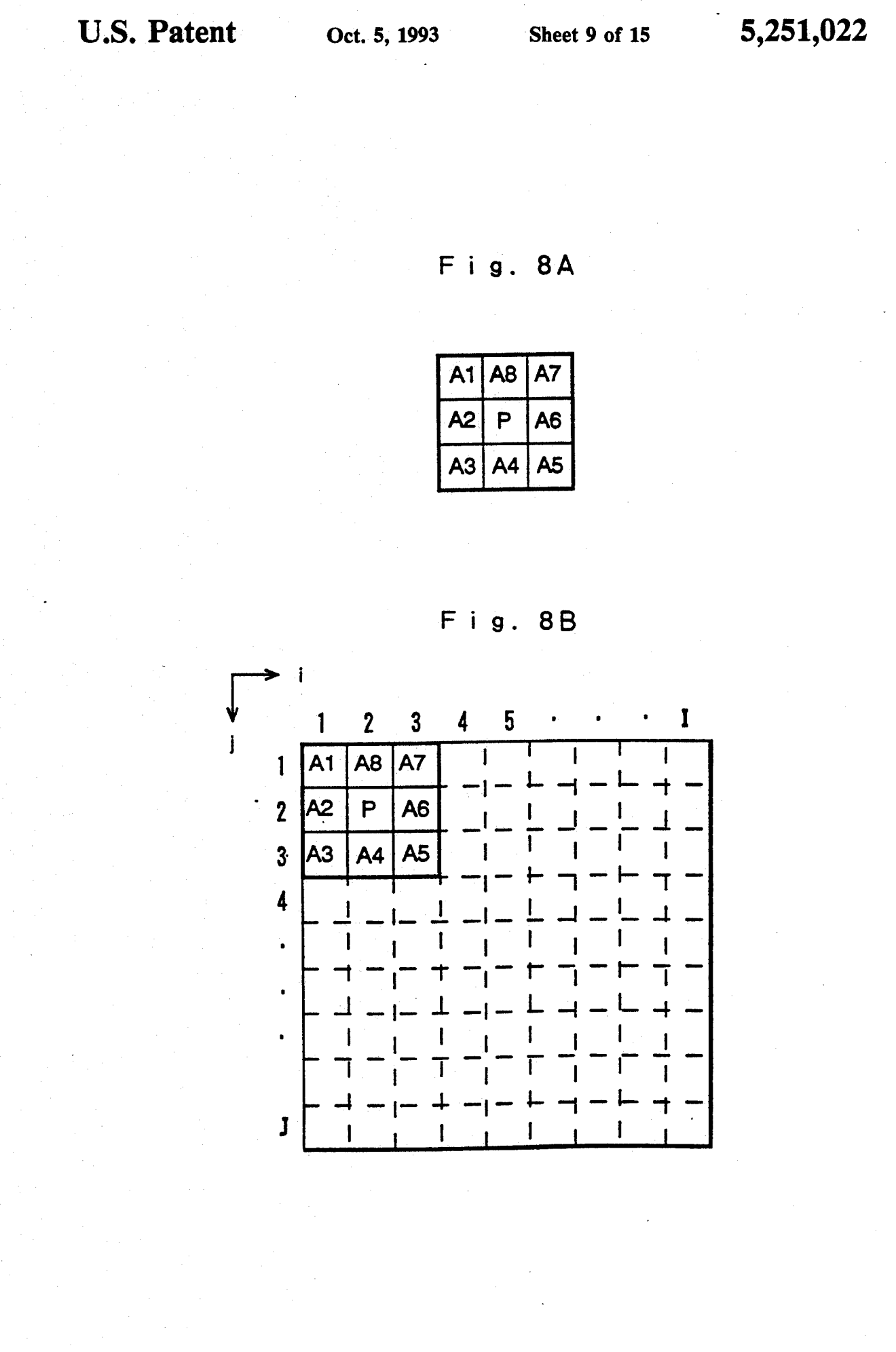

FIG. 7 is a flowchart showing details of the expansion process of step S62. FIG. 8A shows a 3×3 mask Mp used for the expansion, and FIG. 8B shows a typical arrangement of pixel coordinates of a target image for the overlapping process. The value of a coordinate j in the main scanning direction ranges from 1 to J while that of a coordinate i in the subscanning direction ranges from 1 to I in FIG. 8B.

Figures 9A, 9B:
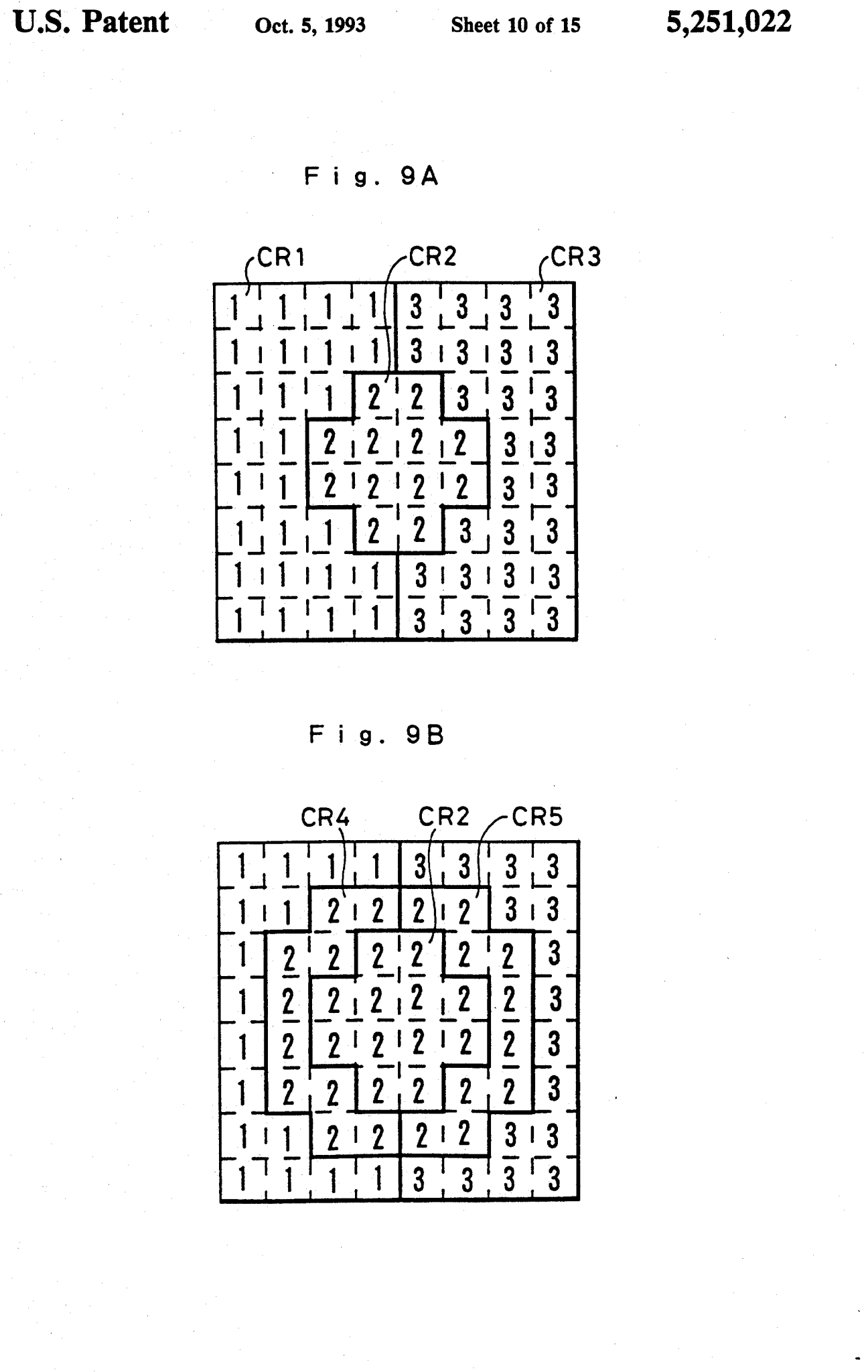

FIG. 9A is a conceptive view showing the color number Nc allocated to each pixel in the image of FIG. 5B. The size of each pixel is exaggerated for clarity.

The following data are stored as image memory information of each pixel P(i,j) in the auxiliary memory 10 prior to the expansion:

a. color number Nc(i,j);
b. Flag Fp(i,j); and
c. Reference color number Nr(i,j).

At step S201, the 3×3 mask Mp is placed at the starting position on the image; that is, the end of the pixel coordinates of FIG. 8B.

An area of one pixel wide is produced on the circumference of the target area Cr2 and pixel memory information is updated for each pixel in the area of one pixel width through the following steps S202 to S208.

At step S202, it is judged whether the flag Fp is ON for a central pixel P of the 3×3 mask Mp. When the flag Fp is ON, the program skips steps S203 through S208 and proceeds to step S209. When the answer is NO at step S202, on the other hand, the program proceeds to step S203.

At step S203, it is judged whether the central pixie P exists in the target area CR2. The color number Nc(P) of the central pixel P is compared with the color number Nc(CR2) of the target area CR2. When the color number Nc(P) is equal to Nc(CR2), the program proceeds to step S204, at which the value of a pointer n is initialized to one.

The pointer n is related to coordinates (i,j) of the eight peripheral pixels in the 3×3 mask Mp when the coordinate of the central pixel P is (Pi,Pj), as follows:

$n=1; (i,j)=(Pi-1,Pj-1)$ $n=2; (i,j)=(Pi-1, Pj)$ $n=3; (i,j)=(Pi-1, Pj+1)$ $n=4; (i,j)=(Pi,Pj+1)$ $n=5; (i,j)=(Pi+1,Pj+1)$ $n=6; (i,j)=(Pi+1, Pj)$ $n=7; (i,j)=(Pi+1, Pj-1)$ $n=8, (i,j)=(Pi,Pj-1)$

In FIG. 8A, the coordinates of the central pixel are (2,2), and the relation is shows as:

$n=1; (i,j)=(1,1)$ $n=2; (i,j)=(1,2)$ $n=3; (i,j)=1,3)$ $n=4; (i,j)=(2,3)$ $n=5; (i,j)=(3,3)$ $n=6; (i,j)=(3,2)$ $n=7; (i,j)=(3,1)$ $n=8; (i,j)=(2,1)$

At step S205, it is judged whether a peripheral pixel An (n=1 to 8) specified by the pointer n in the 3×3 mask Mp exists in the target area CR2. The color number Nc(An) of the peripheral pixel An is compared with the color number Nc(CR2) of the target area CR2.

When the color number Nc(An) is equal to Nc(CR2), the program proceeds to step S206a at which the color number Nc(i,j) of the Q pixel An(i,j) is stored as temporary data Nc0(i,j) prior to update of image memory information including Nc, Fp and Nr. At step S206b, the image memory information of the peripheral pixel An(i,j) is updated as follows:

Color number: Nc(i,j)=Nc(CR2);

Flag: Fp(i,j)='ON'; and

Reference color number: Nr(i,j)=Nc0(i,j).

Although the color number of the peripheral pixel An(i,j) is stored as temporary data Nc0(i,j) at step S206a in the embodiment, step S206a can be omitted by modifying the order of rewriting in step S206b as follows:

Nr(i,j)=Nc(i,j);

Fp(i,j)='ON'; and

Nc(i,j)=Nc(CR2).

When the color number of the peripheral pixel An(i,j) is different from that of the target area CR2 at step S205, the program skips steps S206a and S206b and proceeds to step S207.

The value of the pointer n is increased by one at step S207. When the value of the pointer n is less than eight, the program returns to step S205 and repeats steps S205 through S208 for all the eight peripheral pixels A1 through A8.

When the flag Fp of the central pixel P is ON at step S202 or when the color number Nc(P) of the central pixel P is not equal to the color number Nc(CR2) of the target area CR2 at step S203, the program proceeds to step S209.

Steps S209 and S210 means that the 3×3 mask Mp is proceeded by one pixel in the main scanning direction, or downward in FIG. 8B, when the 3×3 mask Mp is not positioned at the end of the last scanning line on the target image. Step S209 includes the process that the 3×3 mask Mp is transferred to the start of a next scanning line when the 3×3 mask Mp is positioned at the end of a scanning line.

Steps S202 through S208 are repeated at each position in the image while the 3×3 mask Mp is proceeded according to steps S209 and S210 until the 3×3 mask Mp is positioned at the end of the last scanning line. As a result, an area of one pixel width is produced on the circumference of the target area CR2.

At step S211, the number of pixels m in the overlapping area is decreased by one. In the embodiment, the initial value of m is set equal to two at step S61 of FIG. 6, and hence the number of pixels m becomes equal to 1 at step S211.

When the number of pixels m is not equal to zero at step S212, the program returns to step S201, and the whole routine is executed again.

Figure 9C:
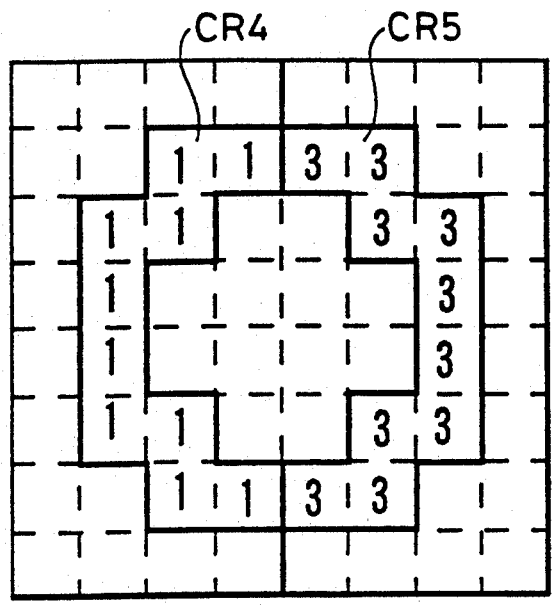

The overlapping image areas CR4 and CR5 having a width of the pixel number m are produced on the circumference of the target area CR2 consequently. In other words, the target area CR2 is expanded by the number of pixels m. FIG. 9B shows distribution of the color numbers of the image including the overlapping image areas CR4 and CR5 thus produced. FIG. 9C shows distribution of the reference color numbers of the overlapping image areas CR4 and CR5. Although the overlapping image areas CR4 and CR5 actually have a width of 2 pixels, the areas CR4 and CR5 of one pixel width are shown in FIG. 9C for convenience of illustration.

After the expansion of the target area CR2 is completed, the program proceeds to step S63 of FIG. 6 at which a new color number is allocated to each of the overlapping image areas CR4 and CR5 produced at step S62.

Figure 10:
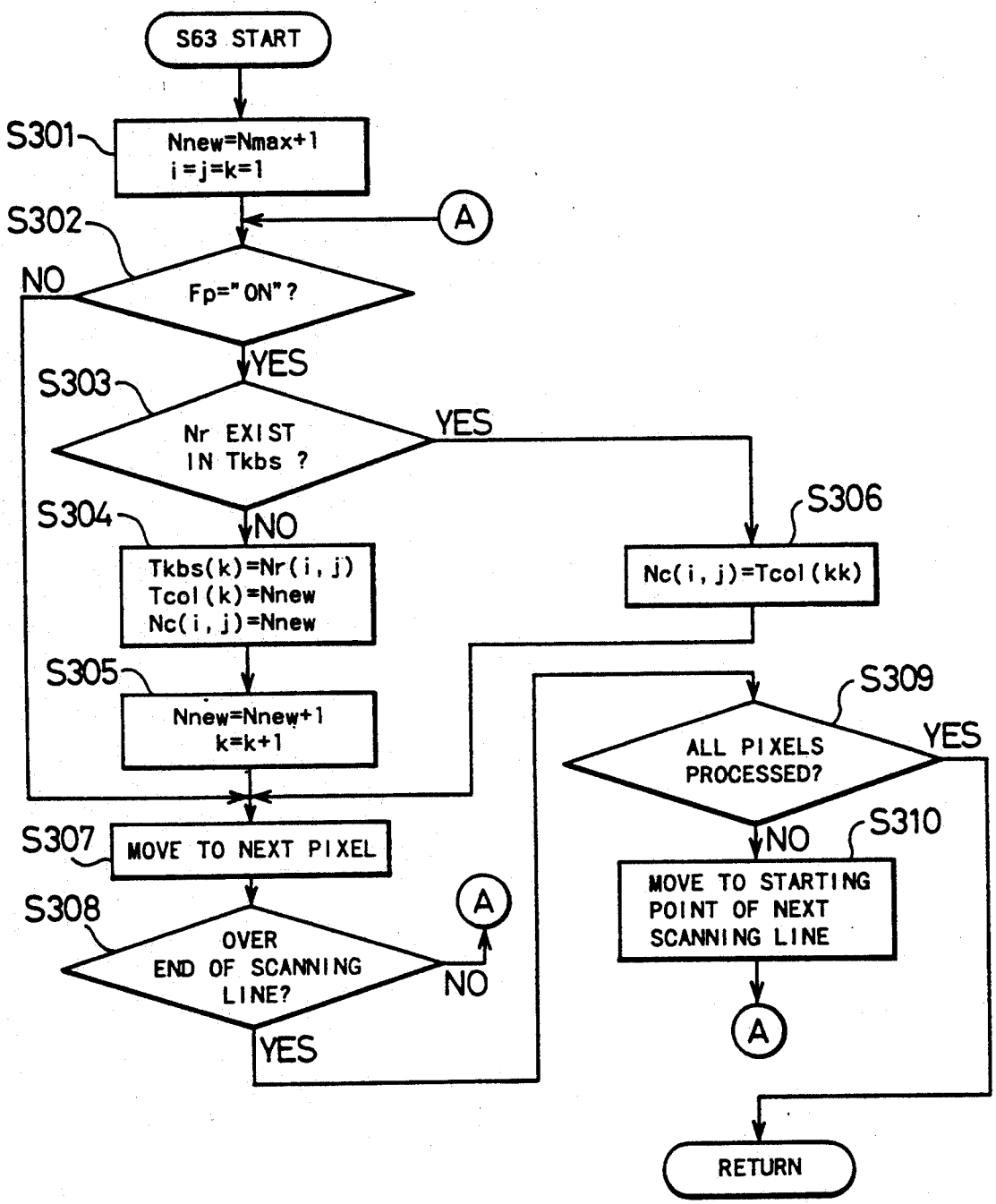
FIG. 10 is a flowchart showing details of color allocation to the overlapping image area.

FIG. 10 is a flowchart showing details of the processing of step S63.

At step S301, a maximum value Nmax (Nmax =3 in the embodiment) of the color number Nc plus one is set as a new color number Nnew (=4). The coordinates (i,j) of the target pixel and a new color number pointer d are initialized to one.

The following two data tables used for the processing of FIG. 10 are stored in the auxiliary memory 10:

New color number table Tcol for storing new color numbers allocated to overlapping image areas; and Reference number table Tkbs for storing reference color numbers corresponding to the new color numbers of the overlapping image areas.

At step S302, a pixel with the flag Fp 'ON' is selected. The image memory information of the selected pixel is updated through the following steps S303 to S306.

At step S303, it is judged whether the reference color number Nr(i,j) of the pixel (i,j) is registered in the reference number table Tkbs. When the answer is YES, the program proceeds to step S306 and when the answer is NO, the program executes steps S304 and S305.

Figure 9D:
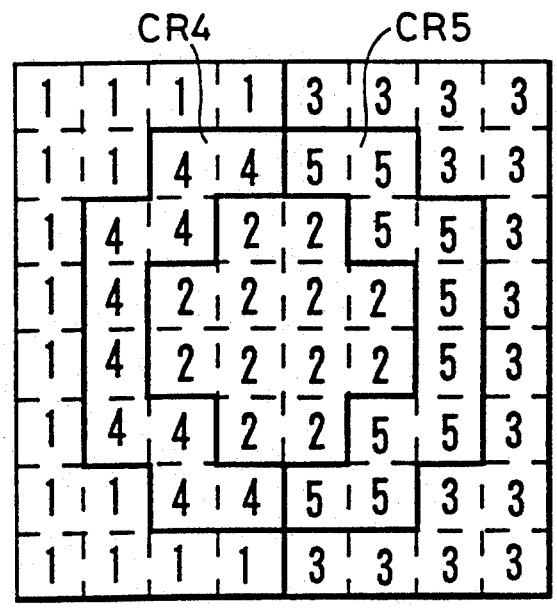

At step S304, the reference color number Nr(i,j) of the target pixel (i,j) is registered in the reference number table Tkbs(k), and the new color number Nnew obtained at step S301 is registered in the new color number table Tcol(k) and set as the color number Nc of the pixel (i,j). Consequently, the new color number is allocated to the pixel (i,j) of the overlapping image area produced by the expansion of step S62. For example, a color number Nc=4 is allocated to the pixels of the overlapping image area CR4 as shown in FIG. 9D.

At step S305, the new color number Nnew and the new color number pointer k are increased by one, respectively. In the embodiment, Nnew becomes equal to five, and k becomes equal to two.

When the reference color number Nr has been registered as data Tkbs(kk) of the pointer kk in the reference number table Tkbs by execution of step S304 in the previous routine, the answer at step S303 is YES and the program proceeds to step S306. The color number of the pointer kk is read out of the new color number table Tcol(kk) and set as the color number Nc(i,j) of the pixel (i,j) at step S306.

At the following step S307, the coordinates (i,j) of the target pixel are increased by one, and thereby the target pixel is moved by one pixel in the main scanning direction.

When the target pixel (i,j) is not over the end of a scanning line at step S308, the program returns to step S302 and repeats the processing of steps S302 through S307. On the other hand, when the pixel (i,j) is over the end of a scanning line at step S308, the program proceeds to step S309 at which it is judged whether the processing is completed for all pixels, and to step S310 at which the target pixel is moved to the start of a next main scanning line. When the target pixel (i,j) is at the end of the last scanning line at step S309, the program exits the routine.

FIG. 9D shows distribution of the color number Nc in the target image as a result of the above processing. A color number 4 is allocated to the first overlapping image area CR4 and another color number 5 to the second overlapping image area CR5.

After the allocation of new color numbers at step S63 of FIG. 6, the program proceeds to step S64 at which a color number table is created for each of the overlapping image areas CR4 and CR5. The color number table stores dot% of color components Y, M, C, and K corresponding to the color number Nc (=4 or 5) of the overlapping image area CR4 or CR5.

Figure 11:
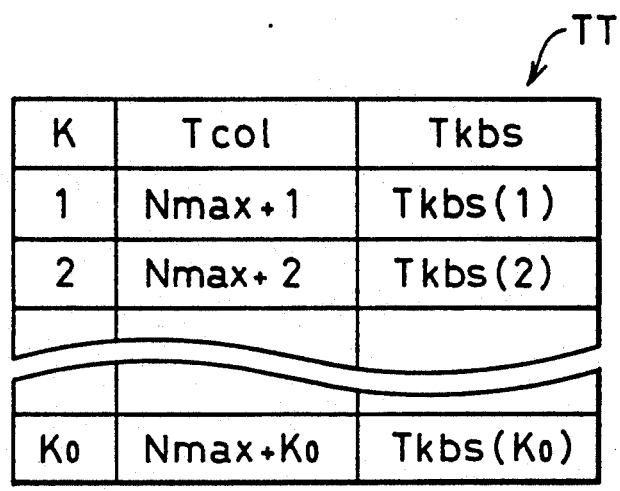
FIG. 11 is an explanatory view illustrating a temporary memory table TT created by the process of FIG. 10.

FIG. 11 shows a temporary memory table TT stored in the auxiliary memory 10 on completion of step S63. In the temporary memory table TT, a number of color areas K0 in the target image is calculated by subtracting one from the new color number pointer k determined at the end of processing of step S63 (or steps S301 through S310):

$$K0 = k - 1 \tag{1}$$

At step S64, the dot percents(%) of color components Y, M, C, and K corresponding to the color number Nc(=4 or 5) of each overlapping image area (CR4 or CR5) are determined according to the temporary memory table TT.

$$Y(Nmax+k) = MAX(Y(CR2), Y(Tkbs(k))) \tag{2a}$$

$$M(Nmax+k) = MAX(M(CR2), M(Tkbs(k))) \tag{2b}$$

$$C(Nmax+k) = MAX(C(CR2), C(Tkbs(k))) \tag{2c}$$

$$K(Nmax+k) = MAX(K(CR2), K(Tkbs(k))) \tag{2d}$$

where:

k is a pointer, used in the flow of FIG. 10, for specifying each overlapping image area; in the embodiment, k is equal to one for the first overlapping image area CR4, and is equal to two for the second overlapping image area CR5;

Y(CR2) is a dot% of the yellow component in the target area CR2; and

Y(Tkbs(k)) is a dot% of the yellow component represented by the reference color number Tkbs(k) in the overlapping image area specified by the pointer k.

The operator MAX selects the larger value out of two values in the parenthesis.

The same definition is applied to the other color components magenta (M), cyan (C), and black(K).

Figure 12:
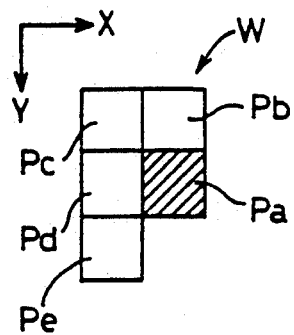
FIG. 12 is a view showing a window W used for region segmentation process.

In the embodiment described above, the overlapping image areas CR4 and CR5 have a predetermined width d, and the dot% of each color component in the overlapping image area CR4 or CR5 is set equal to the larger value between the dot% of the target area CR2 and the original dot% of the image area which is converted to the overlapping image area CR4 or CR5. All an operator has to do is to specify the target area; the shape and the color of the overlapping image area are automatically determined in the specified target area. Accordingly, the overlapping process is readily executed even for an image including a large number of target areas and for an image including target areas in complicated shapes. D. Procedure of Region Segmentation The region segmentation is performed in the following manner, for example. FIG. 12 is a view showing a window W used in the region segmentation process. The shaded pixel Pa is a pixel-to-be-processed, and peripheral pixels Pb through Pe are in contact with the pixel Pa.

The window W is successively moved in the main scanning direction Y in such an order that a scanning line at smaller subscanning coordinate X is scanned earlier. When only the pixel Pa is black and none of the other pixels Pb through Pe is black, a new system color number Ns is allocated to the pixel Pa. On the other hand, when the pixel Pa and any one of the peripheral pixels Pb through Pe are black, the system color number Ns allocated to the black peripheral pixel is given to the pixel Pa as its system color number Ns.

The pixel Pa in white is processed in a similar manner. That is, a new system color number Ns is allocated to the pixel Pa when all of the peripheral pixels are black, and the same system color number Ns is allocated to the pixel Pa as that of a white peripheral pixel when any one of the peripheral pixels is white. But when the target pixel Pa and the pixels Pc and Pe each obliquely in contact with Pa are white, and the other pixels Pb and Pd are black, a different system color number Ns is allocated to the pixel Pa from that of the pixels Pc and Pe. This makes these white pixels only obliquely contacting each other to be separate regions. As a result, a black separate region and a white separate region which obliquely intersect each other are prevented.

While the window W is moved, different system color numbers Ns are successively allocated to independent regions. In such processing, there are some cases that two or more system color numbers Ns are allocated to one region. FIGS. 13A through 13D are explanatory views showing processes in such a case.

Figure 13A:
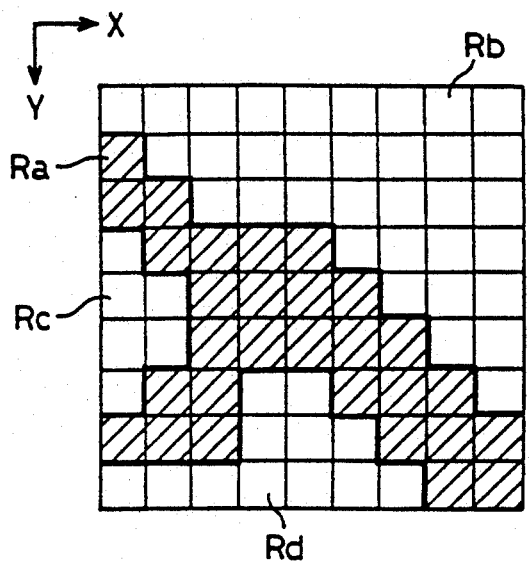

Suppose, as shown in FIG. 13A, a block copy image includes a black region Ra and three independent white regions Rb, Rc, and Rd separated by the region Ra.

While the window W is successively moved in the main scanning direction Y in such an order that a scanning line at smaller subscanning coordinate X is scanned earlier, different system color numbers Ns are allocated to the respective regions Ra through Rd.

Figure 13B:
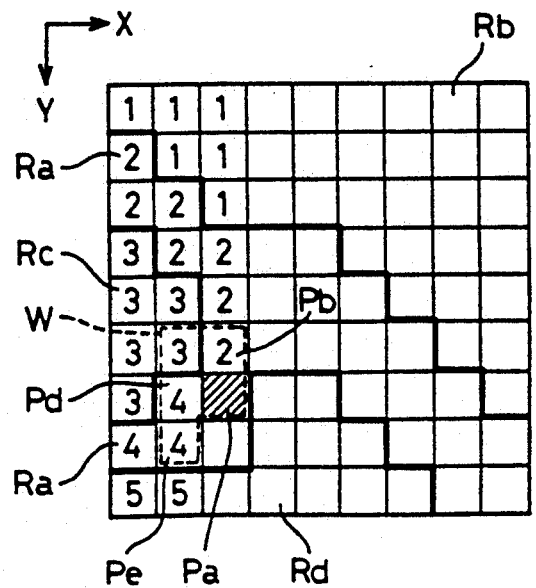
Figures 13C, 13D, 14:
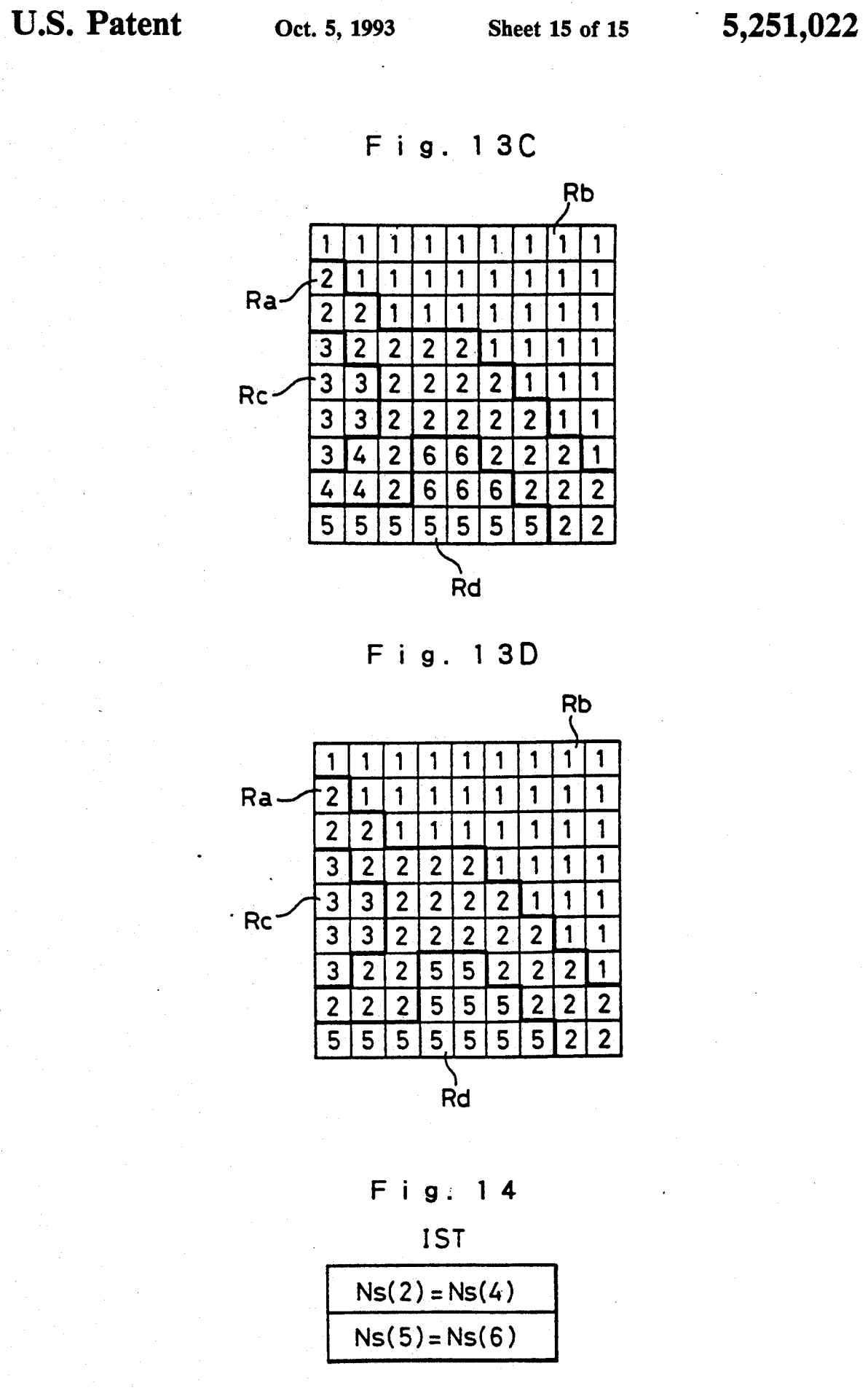

Numerals on pixels denote the system color numbers Ns allocated to the pixels in FIG. 13B. Pixels without numerals do not have the system color numbers Ns yet. As seen in FIG. 13B, the black region Ra includes pixels to which a numeral 2 is allocated as the system color number Ns and those with a numeral 4. When the window is on the position shown in FIG. 13B, the system color number Ns on the pixel Pb in contact with the target pixel Pa is equal to 2, and those on the peripheral pixels Pd and Pe are equal to 4. Information representing that Ns=2 and Ns=4 denote the same system color is temporarily stored in the auxiliary memory 62, and the smaller system color number Ns=2 is allocated to the target pixel Pa. FIG. 13C shows a system color image or an image filled with respective system colors, and FIG. 14 shows an identical system color table IST, both obtained as a result of such processing for all the pixels of FIG. 13A.

The table IST indicates that the system color numbers Ns=2 and Ns=4 denote an identical system color; that is, they are allocated to the same image region. The table IST also indicates that the numbers Ns=5 and Ns=6 also denote an identical system color. The table IST is stored in the auxiliary memory 10.

The arithmetic and control unit 6 then reallocates a common system color number (for example, the smallest system color number) to pixels with different system color numbers in the same image region for the image of FIG. 13C based on the table IST. The result of such processing is shown as an image of FIG. 13D, in which each of the regions Ra through Rd has one system color number Ns which is different from those of the other regions.

An operator can assign desired colors as display colors to respective image regions after different system colors are allocated to them. In this case, the overlapping process is performed while using either of the color numbers representing the display color and the system color.

The invention is not limited to the above embodiments, but there can be many modifications and changes without departing the scope of the invention. Some examples of such modification are shown below.

In the embodiment, the dot% of each color component in the overlapping image area is set equal to the larger value of the dot% of the target area and the original dot% of the overlapping image area, which is specified by the reference color number. The dot% of the overlapping image area can, however, be determined by averaging the dot% of the target area and the original dot% of the overlapping image area according to a predetermined calculation; for example, simple averaging or averaging after a predetermined factor of factors are applied.

The expansion of the target area is performed on the basis of bit map data, and whether to expand or not is judged for each pixel with the 3×3 mask Mp in the above embodiment. Alternatively, the expansion can be performed by preparing a contour vector of the target area, and producing an expanded contour vector of the expanded target area expanded by a predetermined width d.

Concentration of each color component or any other value quantitatively representing each color component can be used instead of dot%.

According to the present invention, an overlapping image area of a predetermined width is produced along the contour of a target area, and a color is allocated to each pixel in the overlapping image area based on the original color of the pixel and the color of the target area. The method of the invention automatically determines width and color of the overlapping image area, and therefore has an advantage of the ease with which the overlapping process is performed for the image including a large number of image areas.

Colors of overlapping image areas can be determined by averaging color components of the original color of the pixel in the overlapping area and those of the color of the target area according to a predetermined averaging calculation. Such averaging process makes the color of the overlapping image area similar to that of the target area and its adjacent image area, thus making the overlapping image area unobtrusive.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing an overlapping image area on a boundary between adjacent image areas by processing image data of an original image including said image areas, comprising the steps of:

(a) selecting one image area in said original image as a target area;

(b) expanding said target area to produce said overlapping image area having a predetermined width along the contour of said target area; and (c) assigning a color to each pixel in said overlapping image area based on the original color of the pixel before said step (b) and the color of said target area.

2. A method in accordance with claim 1, wherein said step (a) comprises the steps of:
   (a-1) preparing an original image data representing a black-and-white original image; and
   (a-2) performing color allocation on said original image on the basis of said original image data by dividing said black-and-white original image into plural image areas which are separate connected-components, and by allocating different colors to said respective plural image areas.

3. A method in accordance with claim 2, wherein said step (b) comprises the steps of:
   (b-1) positioning a pixel mask for detecting a boundary between image areas at each pixel in an area including said target area, and adding a particular pixel in said pixel mask when detected to be at a boundary of said target area, to thereby expand said target area by a width of one pixel ; and
   (b-2) repeating said step (b-1) N times, where N is an integer, to thereby expand said target area by a width of N pixels.

4. A method in accordance with claim 3, wherein said step (c)
   (c-1) determining density of each color component of said color for each pixel in said overlapping image area by selecting the larger value of densities of the pixel before said step (b) and of said target area with respect to each color component.

5. A method in accordance with claim 3, wherein said stpe (c) comprises the step of:
   (c-2) determining density of each color component of said color for each pixel in said overlapping image area by averaging densities of the pixel before said stpe (b) and of said target area with respect to each color component.

6. A method in accordance with claim 2, wherein said step (b) comprises the step of:
   (b-1) preparing a first contour vector representing a contour of said target area; and
   (b-2) obtaining a second contour vector representing a contour of an expanded area, said contour of said expanded area distanced from said contour of said target area by said predetermined width.

7. A method in accordance with claim 6, wherein said step (c) comprises the step of:
   (c-1) determining density of each color component of said color for each pixel in said overlapping image area by selecting the larger value of densities of the pixel before said stpe (b) and of said target area with respect to each color component.

8. A method in accordance with claim 6, wherein said step (c) comprises the step of:
   (c-2) determining density of each color component of said color for each pixel in said overlapping image area by averaging densities of the pixel before said stpe (b) and of said target area with respect to each color component.

9. An apparatus for producing an overlapping image area on a boundary between adjacent image areas by processing image data of an original image including said image areas, comprising:
   selecting means for selecting one image area in said original image as a target area;
   expanding means for expanding said target area to produce said overlapping image area having a predetermined width along he contour of said target area; and
   color assigning means for assigning a color to each pixel in said overlapping image area based on the original color of the pixel before said expanding and the color of said target area.

10. An apparatus in accordance with claim 9, further comprising:
    means for storing an original image data representing a black-and-white original image; and
    means for performing color allocation on said original image on the basis of said original image data by dividing said black-and-white original image into plural image areas which are separate connected-components, and by allocating different colors to said respective plural image areas.

11. An apparatus in accordance with claim 10, wherein said expanding means comprises:
    means for positioning a pixel mask for detecting a boundary between image areas at each pixel in an area including said target area, and adding a particular pixel in said pixel mask when detected to be at a boundary of said target area, to thereby expand said target area by a width of one pixel; and repeating the one-pixel-width expanding N times, where N is an integer, to thereby expand said target area by a width of N pixels.

12. An apparatus in accordance with claim 11, wherein said color assigning means comprises:
    means for determining density of each color component of said color for each pixel in said overlapping image area by selecting the larger value of densities of the pixel before said expanding and of said target area with respect to each color component.

13. An apparatus in accordance with claim 11, wherein said color assigning man comprises:
    means for determining density of each color component of said color for each pixel in said overlapping image area by averaging densities of the pixel before said expanding and of said target area with respect to each color component.

14. An apparatus in accordance with claim 10, wherein said expanding means comprises:
    means for preparing a first contour vector representing a contour of said target area; and
    means for obtaining a second contour vector representing a contour of an expanded area, said contour of said expanded area distanced from said contour of said target area by said predetermined width.

15. An apparatus in accordance with claim 14, wherein said color assigning means comprises:
    means for determining density of each color component of said color for each pixel in said overlapping image area by selecting the larger value of densities of the pixel before said expanding and of said target area with respect to each color component.

16. An apparatus in accordance with claim 14, wherein said color assigning means comprises:
    means for determining density of each color component of said color for each pixel in said overlapping image area by averaging densities of the pixel before said expanding and of said target area with respect to each color component.

* * * * *